(No Model.)
E. B. BUDD & W. R. SANDS.
HITCHING STRAP FOR DOUBLE TEAMS.
No. 440,910. Patented Nov. 18, 1890.
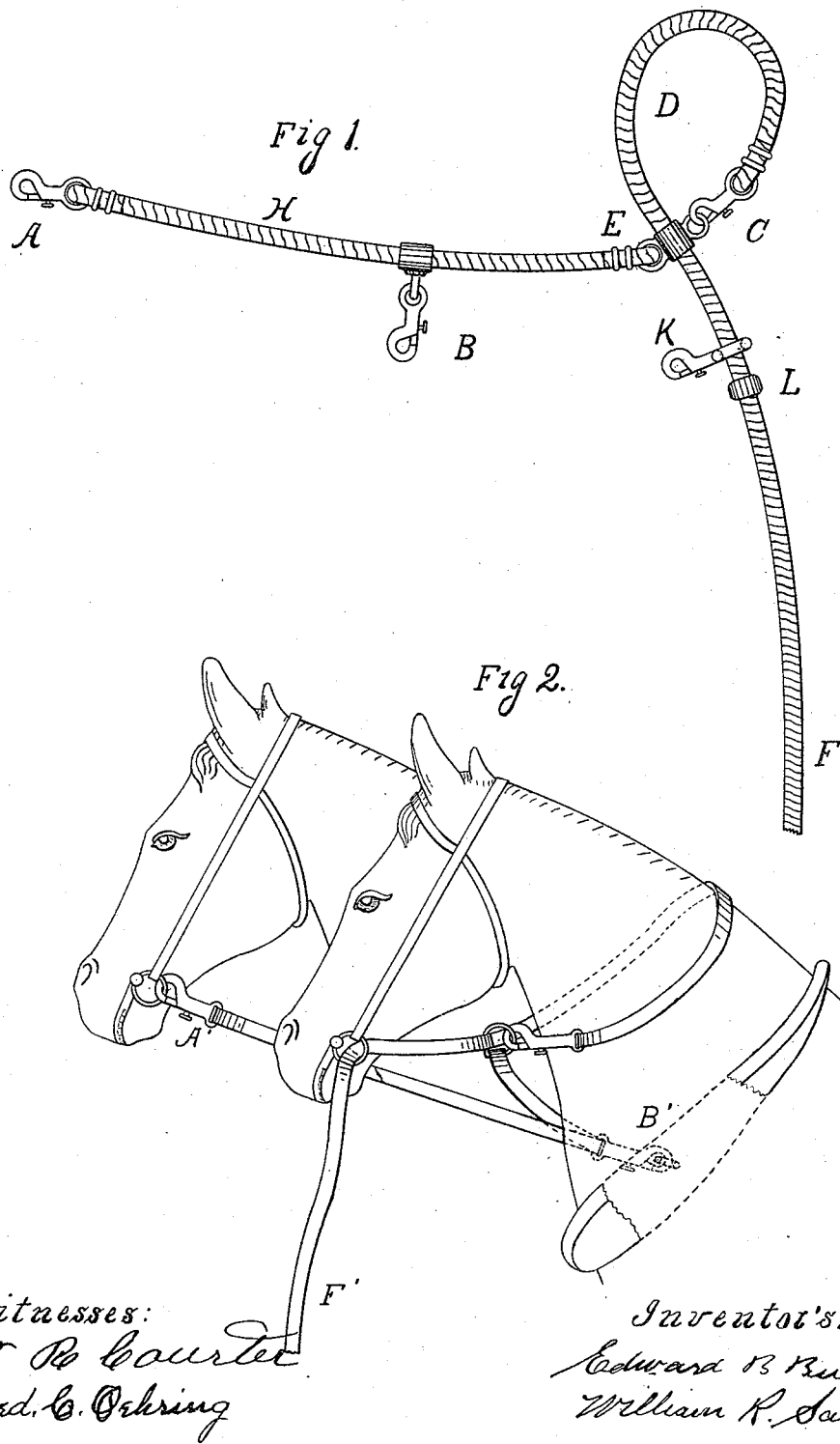
Witnesses:
Wm. R. Courter
Fred. C. Oehring
Inventor's:
Edward B. Budd
William R. Sands

UNITED STATES PATENT OFFICE.

EDWARD B. BUDD, OF BLOOMFIELD, AND WILLIAM R. SANDS, OF NEWARK, NEW JERSEY.

HITCHING-STRAP FOR DOUBLE TEAMS.

SPECIFICATION forming part of Letters Patent No. 440,910, dated November 18, 1890.

Application filed February 14, 1890. Serial No. 340,498. (No model.)

*To all whom it may concern:*

Be it known that we, EDWARD B. BUDD and WILLIAM R. SANDS, citizens of the United States, residing, respectively, in the town of Bloomfield and city of Newark, in the county of Essex, and State of New Jersey, have invented a new and convenient means of securely tying a double team of animals; and we do hereby declare that the following is a clear and exact description of our invention, which will enable others skilled in the art to which it appertains to make and use the same.

Heretofore it has been the custom to tie the animal nearest the hitching-post by using a neck-strap or a tie-strap attached to the driving-bit and allowing the other animal to stand without tying, which in many cases would be unsafe. To guard against possible accidents which may occur by allowing one horse to stand without tying, many persons use a separate neck or tie strap for each animal and attach both these straps to the hitching-post. This latter plan is the one most generally employed; but it is more or less troublesome to tie the two separate straps to the post, and then the animal farthest from the post is free to move forward and around it, thus crowding his mate against the curb or back from the post, all of which is very liable to make him pull on the tie-strap; or the necessarily-long strap on the animal farthest from the post may become entangled with the harness or neck-yoke, all of which is very annoying, and in some cases might be dangerous. To overcome these objections, as well as others that might be named, we have constructed a double-team neck or tie strap in the manner shown on the accompanying drawings, Figures 1 and 2, and described as follows:

To the ordinary single neck-strap D F, Fig. 1, such as is commonly used in tying a single horse, we propose to place a snap-hook K and a collar L, the hook K being perfectly free to move either up or down between the collar and casting E. To the ring on casting E, Fig. 1, is fastened a suitable size and length rope or leather strap, or any other suitable material. At the proper distance on this last-mentioned rope or strap from the casting E is fastened a hook, preferably a spring snap-hook B, and at the end of this rope or strap is attached a hook, which may be either a plain or snap hook, or, if desired, a suitable-sized buckle might be used, making in all a convenient method of attaching this end of the rope or strap H to the driving-bit.

In making use of our invention we propose that the animal standing nearest the hitching-post shall be securely tied thereto and that his mate shall also be tied to the same rope or strap in such a manner that he cannot move forward, or that the rope or strap cannot become in any way entangled in the harness or neck-yoke, all in the manner shown at Fig. 2, and fully described as follows: Place the rope or strap D around the neck of the animal nearest the object to which it is proposed to tie the team and fasten it by means of snap-hook C. Then to either the hames or trace, or to any ring or loop which may be provided on said hames or trace on this same animal, the snap-hook B should be attached in the manner shown at B', Fig. 2. The hook A or any other suitable device which may be provided for the purpose should then be fastened to the other animal at the bit, and the rope or strap F can be passed through the bit-ring, or, preferably, the snap-hook K, Fig. 1, should connect with the bit-ring, and then the rope or strap F can be tied to the hitching-post. The snap-hook K being perfectly loose on the rope or strap, it will readily adjust itself, and is more convenient and much easier on the horse than passing the strap through the ring on bit. The collar or band L is fastened securely to the rope or strap F, thus preventing the snap-hook K being lost when the tie-strap is not in use.

One of the principal objects attained by using our double-team tie-strap is that we only have one strap to tie, and at the same time both animals are controlled by having the tie-strap attached to the bits on each animal, and it is obvious that by this arrangement the horse standing farthest from the hitching-post cannot move forward without pulling directly against his mate.

We are aware that prior to our invention the single neck-strap has been used, and we do not, therefore, claim such a combination broadly; but What we do claim in our invention, and desire to secure by Letters Patent, is—

As an article of manufacture, the double-team tie-strap, consisting of neck-strap D F, strap H, snap-hooks A, B, and K, the collar L, the same constructed of rope or leather or other suitable material, substantially as described, and for the purpose specified.

EDWARD B. BUDD.
WILLIAM R. SANDS.

Witnesses:
 WM. R. COURTIE,
 T. E. HAYES.